United States Patent Office 3,712,889
Patented Jan. 23, 1973

---

3,712,889
OXODIHYDROBENZOTHIAZINE-S-DIOXIDES
Enrico Sianesi, Milan, and Paolo Da Re, Pisa, and Ivo Setnikar and Elena Massarani, Milan, Italy, assignors to Recordati S.A. Chemical and Pharmaceutical Company, Lugnano, Switzerland
No Drawing. Filed May 11, 1970, Ser. No. 36,477
Int. Cl. C07d 93/02
U.S. Cl. 260—243 R  4 Claims

ABSTRACT OF THE DISCLOSURE

A 3- or 4-oxo-dihydrobenzothiazine-S-dioxide of the general formula:

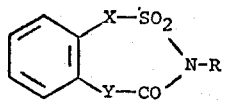

(I)

in which either X or Y stand for a single bond and the other stands for methylene ($CH_2$) and R represents hydrogen or alkyl, alkenyl, propargyl, benzyl, carbethoxy, dialkyl aminoalkyl or cycloaminoalkyl or a group of the formula —$CH_2$—$COOR_1$, in which $R_1$ represents hydrogen or alkyl, dialkylaminoalkyl or cycloaminoalkyl, or R represents a group of the formula:

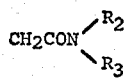

(II)

in which $R_2$ and $R_3$ are identical or different and each represent hydrogen, alkyl or alkenyl or dialkylaminoalkyl or cycloamino-alkyl group or, together with the nitrogen atom to which they are attached, form a heterocyclic amino group, or R represents an unsubstituted phenyl or a chloro-substituted or sulfamyl-substituted phenyl and methods for the preparation thereof. These compounds are therapeutically active particularly on the central nervous system, e.g., hypnotic activity.

---

The present invention relates to new 3- or 4-oxodihydrobenzothiazine-S-dioxides of the general formula:

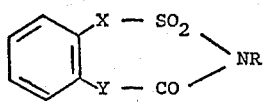

(I)

in which either X or Y stand for a single bond and the other stands for methylene ($CH_2$) and R represents hydrogen or alkyl, alkenyl, propargyl, benzyl, carbethoxy, dialkyl aminoalkyl or cycloaminoalkyl or a group of the formula —$CH_2$—$COOR_1$, in which $R_1$ represents hydrogen or alkyl, dialkylaminoalkyl or cycloaminoalkyl, or R represents a group of the formula:

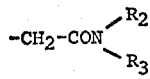

(II)

in which $R_2$ and $R_3$ are identical or different and each represent hydrogen, alkyl or alkenyl or dialkylaminoalkyl or cycloaminoalkyl or, together with the nitrogen atom to which they are attached, form a heterocyclic amino group, or R represents an unsubstituted phenyl or a chloro-substituted or sulfamyl-substituted phenyl.

The alkyl or alkenyl groups which are represented by R or which form part thereof preferably contain 1 to 5 carbon atoms.

The overall Formula I therefore covers compounds of the formulas:

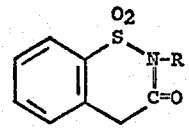

(III)

and

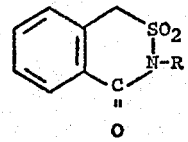

(III′)

that is to say, 3,4-dihydro-3-oxo-2H-1,2-benzothiazine-S-dioxide (III), 3,4-dihydro-4-oxo-1H-2,3-benzothiazine-S-dioxide (III′) and their N-substituted derivatives.

When the compounds of overall Formula I contain a nitrogen atom of basic nature, the invention extends to the acid addition salts of these compounds, such as the hydrochlorides.

The compounds of Formula I in which R represents alkyl or alkenyl or a group of the formula:

in which $R_2$ and $R_3$ are as defined above represent a preferred class of the compounds of the invention.

A particularly preferred compound is 2-(3,4—dihydro-4-oxo-1H-2,3-benzothiazin - 3 - yl) - N,N - dimethylacetamide-S-dioxide.

The compounds of Formula I are therapeutically active. They have an activity on the central nervous system, particularly a hypnotic activity.

Pharmacological tests have been carried out on a number of compounds of the invention and the results of these tests are collected in Table I below. The substances were administered intraperitoneally to NMRI (National Marine Research Institute) white mice. The 50% lethal doses ($DL_{50}$) were determined 48 hours after the administration of the substances. For 50% hypnotic doses ($DH_{50}$), the hypnosis was considered to correspond to the disappearance of the straightening reflex. For the determination of the anticonvulsant activity, the animals were subjected to an electric shock 30 minutes after the administration of the substances. The anticonvulsant dose is that which protects 50% of the animals.

All the doses are indicated in mg./kg. body weight.

TABLE I

| Formula | R | $DL_{50}$ | $DH_{50}$ | Anti-convulsant activity |
|---|---|---|---|---|
| III | $CH_3$ | 1,000 |  | 100 |
| III | $C_2H_5$ | 650 |  | 130 |
| III | $C_3H_7$-n | 1,000 | 500 | 200 |
| III | $C_4H_9$-n | 2,400 |  | 200 |
| III | $CH_2CH=CH_2$ | 800 | 800 | 160 |
| III | $CH_2CON(CH_3)_2$ | 840 | 400 | 120 |
| III' | $CH_3$ | 1,150 | 575 | 230 |
| III' | $C_2H_5$ | 2,000 | 2,000 | 200 |
| III' | $C_3H_7$-iso | 2,400 | 400 | 75 |
| III' | $CH_2CH=CH_2$ | 500 | 250 | 100 |
| III' | $CH_2C=CH$ | 2,400 |  | 300 |
| III' | $CH_2CON(CH_3)_2$ | 1,620 | 150 | 60 |
| III' | $CH_2CONHCH_3$ | 1,550 | 750 | 300 |
| III' | $CH_2CONH(C_3H_7$-iso$)$ | 1,800 | 750 | 150 |

It has also been found that 2(3,4-dihydro-4-oxo-1H-2,3-benzothiazine-3-il)N,N-dimethyl-acetamide can be used in the control of insomnia and problems in the rhythm of sleep at the dose of 1 to 2 tablets of 50–100 mg. to be taken in the evening before going to sleep and in cortical irritability and hyperexcitability at the dose of 1 to 2 tablets of 50–100 mg. once or twice per day.

For the preparation of the compounds of general Formula I there are different methods of synthesis, the most advantageous of which are shown in the following diagram:

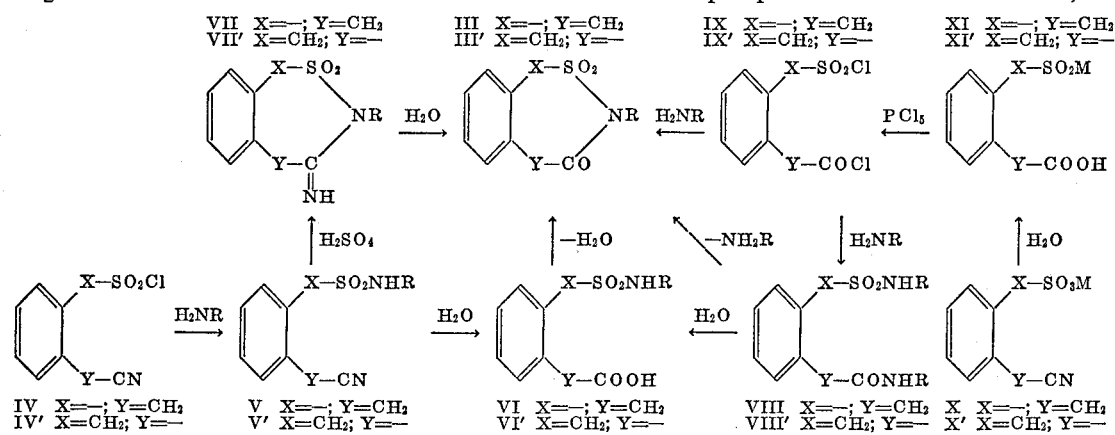

In one aspect of this invention, compounds of the Formula I are prepared by cyclicizing a compound of the formula

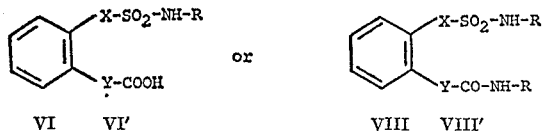

with the removal of one molecule of water or of a molecule of the compound of the formula R—$NH_2$, respectively, in which X, Y and R are as defined above with respect to Formula I.

Thus one of the methods which has been indicated schematically above consists of cyclicizing an o-sulfamoyl phenylacetic acid (VI) or an o-carboxy benzylsulfonamide (VI'), respectively, with a dehydrating agent, for example, phosphorus pentachloride, thionyl chloride, polyphosphoric acid or a mixture of glacial acetic acid and anhydrous sodium acetate, and the latter mixture with addition of acetic anhydride.

The reaction is generally effected by contacting the compound of the Formula VI or VI' with the dehydrating agent at an elevated temperature, for example, from about 60 to about 130° C., for the period of time necessary to effect the conversion, for example, a period of time in excess of about one hour but less than about ten hours. This reaction can thus be effected by boiling these components or by refluxing the mixture.

The compounds VI and VI' used as starting material in the above process can be obtained by hydrolysis either of a corresponding carboxamide (VIII and VIII') or of the corresponding nitrile (V and V'). It should be noted that the primary o-carboxy-benzylsulfonamide (VI', R=H) could not be isolated since it cyclized spontaneously to form 3,4-dihydro-4-oxo-1H-2,3-benzothiazine S-dioxide (III', R=H).

In another aspect of this invention, the compounds of the Formula I are prepared by condensing a compound R—$NH_2$ on an acid of the formula:

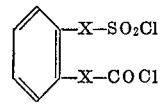

(IX or IX')

wherein R, X and Y are as defined above with respect to Formula I. For example, the acids of the Formula IX or IX' are reacted with R—$NH_2$, for example, ammonia, to produce a diamine of the Formula VIII or VIII' and concurrently therewith the corresponding compounds of the Formula I. The ammonia is generally employed in the excess of that required for stoichiometric conversion. Preferably this reaction is effected with agitation at a reduced temperature, preferably from about —5° C. to about +5° C., and still more preferably about 0° C. After precipitation of the crude diamine, the resultant liquors are acidified to precipitate the compounds of the Formula III or III' which have been produced concurrently therewith.

Another method which has been indicated schematically above consists of cyclicizing a compound of the Formula VIII or VIII' as produced above by deamidization. The amides of Formulas VIII and VIII' can be hydrolyzed in the presence of a base, for example, sodium hydroxide, to form the compounds of Formulas III and III'. The base and the compounds of Formulas VIII and VIII' are contacted at an elevated temperature until the desired level of conversion is obtained.

In another aspect of this invention the compounds of Formula I are prepared by hydrolyzing a compound of the formula

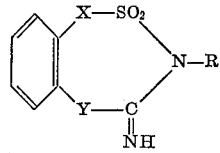

in which X, Y and R are as defined above with respect to Formula I. The above compounds can be hydrolyzed for example, by heating at an elevated temperature with water and a base, for example, sodium hydroxide or sodium bicarbonate, or with water and an acid, for example, hydrochloric acid. For example, this can be accomplished by refluxing the materials or by boiling the materials.

In another aspect of this invention, compounds of the Formula I in which R is other than hydrogen are prepared by reacting a compound of the formula

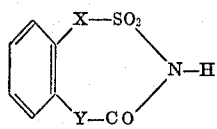

in which X and Y are as defined above or the alkaline salt thereof, with a compound capable of substituting the desired R group on the nitrogen atom. For this purpose, the conventional methods of alkylation and acylation of the imido groups can be used.

It is furthermore possible to form an R group by lengthening a preexisting chain of atoms on the nitrogen atom of the 3,4-dihydro-3-oxo-2H-1,2-benzothiazine S-dioxide or 3,4-dihydro-4-oxo-1H-2,3-benzothiazine S-dioxide. For example, one can form an R group of formula

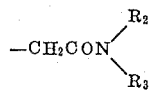

in which $R_2$ and $R_3$ are as defined above by condensing ammonia or an amine of formula $HN(R_2)R_3$ on the S-dioxide of the chloride of 3,4-dihydro-3-oxo-2H-1,2-benzothiazin-2-yl acetic acid or 3,4-dihydro-4-oxo-1H-2,3-benzothiazin-3-yl acetic acid.

As a further example, one can form an R group of formula —$CH_2$—$COOR_1$ in which $R_1$ is as defined above by esterification of any of the substituted acetic acids mentioned above. Thus, compounds of the Formula I in which R is a group of the Formula —$CH_2$—$COOR_1$ are produced by esterifying the acid chloride of a carboxylic acid of the formula:

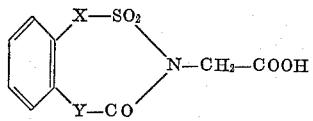

in which X and Y are as defined above the with respect to Formula I, with an alcohol of the formula $R_1$—OH.

In a particularly preferred embodiment of this invention, 2-(3,4-dihydro - 4 - oxo-1H-2,3-benzothiazine-3-il) N,N-dimethylacetamide-S-dioxide is prepared by the following methods. A mixture of o-carboxy-N-(N,N-dimethyl carbamoyl methyl) benzyl sulfonamide

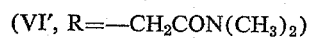

(VI', R=—$CH_2CON(CH_3)_2$)

anhydrous sodium acetate, glacial acetic acid and acetic anhydride are refluxed. The resultant mixture is partially evaporated under reduced pressure and the residue therefrom is taken up in ice water and treated with sodium carbonate. After digestion, the solid product can be collected, washed and dried. In another method, a mixture of the potash salt of 3,4-dihydro-4-oxo-2,3-benzothiazine S-dioxide (III', R=—K) and α-chloro-N,N-dimethyl acetamide are heated at an elevated temperature. More particularly, the reaction mass is heated for periods of time at progressively increasing temperature in the range of from about 100° to about 160° C. Recovery is effected after the completion of the reaction by taking up the reaction mass in chloroform and washing the solution in sodium bicarbonate and water, the organic phase is separated and dried. If the final product contains a small amount of oxygen substituted isomer (lactim form), it can be purified by heating a fine suspension thereof in aqueous sodium carbonate at a moderate temperature.

The different methods of preparation which have been briefly mentioned above are described in further detail in the following examples.

EXAMPLE 1

O-cyanomethyl-benzene sulfochloride (IV)

28.7 g. (0.17 mol) of o-aminophenylacetonitrile hydrochloride (V. Rousseau and H. G. Lindwall, J. Am. Chem. Soc. 72, 3047, 1959) are suspended in 115 ml. of concentrated HCl and are diazotized at 5° C. with 11.8 g. (0.17 mol) of sodium nitrite dissolved in 25 ml. of water. Finally, rapid filtration is effected and it is poured slowly into 170 ml. of a 20% solution of $SO_2$ in acetic acid containing 1.5 g. of $Cu_2Cl_2$. Agitation is effected at room temperature for 1 hour; it is then poured into 450 ml. of water and the solid which separates out is collected; it is dissolved in benzene and the organic solution is washed with water, dried and evaporated; the residue is collected and washed with a small amount of cold ligroin. Crude yield 23 g., M.P. 107–109° C.; from ligroin-benzene M.P. 109–111° C.

Analysis.—Calcd. for $C_8H_6ClNO_2S$ (percent): C, 44.55; H, 2.88; N, 16.44; Cl, 6.49. Found (percent: C, 44.58; H, 3.16; N, 16.24; Cl, 6.63.

EXAMPLE 2

O-cyanomethyl benzene sulfonamide (V, R=—H)

Into a solution of 18.1 g. (0.12 mol) of o-cyanomethyl benzene sulfochloride (IV) in 260 ml. of benzene, maintained in agitation, ammonia is bubbled for 0.5 hour, while coling it on a bath of water and ice. A suspension is obtained which is then filtered; the solid collected is suspended in water and finally collected and washed again. Yield 14 g., M.P. 158–160° C.

EXAMPLE 3

O-cyanomethyl-N-(p-sulfamoylphenyl) benzene sulfonamide (V, R=—$C_6H_4SO_2NH_2$-p)

To a solution of 21.5 g. (0.1 mol) of o-cyanomethyl benzene sulfochloride (IV) in 250 ml. of anhydrous acetone there are added 34.4 g. (0.2 mol) of sulfanilamide and the mixture is boiled under reflux for 3 hours; it is filtered; the residue is washed with acetone and the filtrates are evaporated to dryness. As residue there is obtained a brown oil which is solidified by treatment with dilute HCl. The solid is collected and purified by crystallization and one obtains 24 g. of a crystalline white product.

EXAMPLE 4

O-cyanomethyl-N-(p-chlorophenyl)-benzene sulfonamide (V, R=—$C_6H_4Cl$-p

To 19.4 g. (0.09 mol) of o-cyanomethyl benzene sulfochloride (IV) dissolved in 300 ml. of anhydrous benzene there are added 22.96 g. (0.18 mol) of p-chloroaniline dissolved in 75 ml. of anhydrous benzene. It is boiled under reflux for 7 hours and the p-chloroaniline hydrochloride then separated. It is filtered and the residue is washed with anhydrous benzene; the filtrate is decolorized by boiling it with carbon; it is filtered and evaporated to dryness. There is obtained a solid which is carefully dissolved in water which has been acidulated by HCl; it is collected, washed with water and dried. Upon crystallization there are obtained 22.6 g. of a crystalline white product.

EXAMPLE 5

O-cyanomethyl-N-ethyl benzene sulfonamide (V, R=—$C_2H_5$)

To 18.1 ml. (0.12 mol) of 30% w./v. aqueous ethylamine suspended in 50 ml. of chloroform there are added, with agitation while maintaining the temperature at 20–30° C., 12.07 g. (0.056 mol) of o-cyanomethyl benzene sulfochloride (IV) dissolved in 110 ml. of chloroform. After completion of the addition, the agitation is continued for 3 hours; it is then evaporated to dryness and the residue is taken up with 150 ml. of 1 N NaOH. It is treated with carbon; its filtered and cooled in ice and then acidified with concentrated HCl, thus obtaining 10 g. of product, M.P. 63–66° C.

EXAMPLE 6

O-sulfamoyl phenylacetic acid (VI, R=—H)

5.5 g. (0.028 mol) of o-cyanomethyl benzene sulfonamide (V, R=—H) are boiled under reflux for 3 hours in 85 ml. of 1 N NaOH. It is decolorized, filtered and acidified with concentrated HCl. The product is crystallized by letting it stand overnight in a refrigerator. Yield 4.7 g., M.P. 175–180° C.

EXAMPLE 7

O-phenylsulfamoyl phenylacetic acid (VI, =—$C_6H_5$)

17.7 g. (0.065 mol) of o-cyanomethyl-N-phenyl benzene sulfonamide (V, R=—$C_6H_5$) are boiled under reflux for 10 hours in 200 ml. of 1 N NaOH. Finally it is decolorized with carbon, filtered, precipitated with concentration HCl, and after setting aside, the solid is collected, redissolved in 5% aqueous sodium bicarbonate, filtered, precipitated again with concentrated hydrochloric acid. Yield 15.8 g., M.P. 161–164° C.

EXAMPLE 8

O-ethyl sulfamoyl phenylacetic acid (VI, R=—$C_2H5$)

To 6.05 g. (0.027 mol) of o-ethyl sulfamoyl phenylacetonitrile (V, R=—$C_2H_5$) there are added 270 ml. of 0.2 N NaOH, followed by boiling under reflux for 7 hours; decolorization is effected with charcoal, followed by filtration, cooling, acidification with concentrated HCl and setting aside overnight in a refrigerator. The solid is collected, washed with ice water, redissolved in aqueous $NaHCO_3$, filtered and again precipitated with concentrated HCl. Yield 5.1 g., M.P. 143–145° C.

EXAMPLE 9

O-[N-(carboxy methyl)sulfamoyl] phenylacetic acid (VI, R=—$CH_2COOH$)

A suspension of 5.4 g. (0.019 mol) of 2-carbethoxy methyl-3,4-dihydro-3-oxo-2H-1,2-benzothiazine S-dioxide (III, R=—$CH_2COOC_2H_5$) is boiled under reflux for 3 hours in 60 ml. of water and 10 ml. of concentrated HCl; the resultant solution is decolorized, filtered and set aside overnight at 0° C. There are collected 3.7 g. of crystalline product, M.P. 192–194° C. From the mother liquors evaporated to dryness there is obtained a residue which, crystallized in water, gives an additional 0.2 g. of useful product.

EXAMPLE 10

Potassium o-cyanomethyl benzene sulfonate (X, M=K)

24 g. (0.111 mol) of o-cyanomethyl benzene sulfochloride (IV) are dissolved in 1250 ml. of methanol and treated in the cold with two molar equivalents of 20% methanolic KOH. The heavy microcrystalline KCl is first of all separated by filtration; it is then cooled in ice and 8.2 of product are crystallized. By concentrating the mother liquors to a small volume there are obtained a further 12.4 g. of crude product which is recrystallized from aqueous methanol, which gives a further 11.4 g. of pure product. Total yield 19.6 g., M.P. >300° C.

*Analysis.*—Calcd. for $C_8H_6KNO_3S$ (percent): C, 40.83; H, 2.57; K, 16.62; N, 5.95. Found (percent): C, 40.44; H, 2.71; K, 16.24; N, 5.96.

EXAMPLE 11

Potassium o-carboxy methyl benzene sulfonate (XI, M=K)

To 11.3 g. of potassium o-cyanomethyl benzene sulfonate (X, M=K) there are added 55 ml. of KOH in 10% aqueous solution. Heating is effected under reflux for 8 hours, followed by filtration, cooling, and acidification with concentrated HCl to a pH of about 3. It is concentrated until precipitation starts and cooled, thus obtaining 9.2 g. of white needles, M.P. 240–243° C. (decomposition).

*Analysis.*—Calcd. for $C_8H_7KO_5S$ (percent): C, 37.78; H, 2.77. Found (percent): C, 38.23; H, 2.95.

EXAMPLE 12

3,4-dihydro-3-imino-2H-1,2-benzothiazine S-dioxide (VII, R=—H)

10 g. (0.051 mol) of o-cyanomethyl benzene sulfonamide (V, R=—H) are introduced in individual portions into 100 ml. of concentrated $H_2SO_4$. The resultant solution is set aside for 16 hours; it is then poured into ice and the solid collected and washed. Yield 7.3 g., M.P. 270–273° C.; from aqueous ethanol, M.P. 280–283° C.

*Analysis.*—Calcd. for $C_8H_8N_2O_2S$ (percent): N, 14,28; S, 16.34. Found (percent): N, 14.43; S, 16.32.

EXAMPLE 13

3,4-dihydro-3-oxo-2H-1,2-benzothiazine S-dioxide (III, R=—H)

(A) A mixture of 19.62 g. (0.1 mol) of 3,4-dihydro-3-imino-2H-1,2-benzothiazine S-dioxide (VII, R=—H), 900 ml. of water and 100 ml. of 0.1 N NaOH is boiled under reflux for 4 hours; thereupon it is decolorized, filtered, cooled and acidified in the cold with concentrated HCl. After setting aside there are obtained 14 g. of product having a melting point of 198–200° C. A similar result is obtained by boiling the imino derivative (VII) for 8 hours with the molar equivalent of $Na_2CO_3$ in an 0.1 M solution.

(B) 2.15 g. (0.01 mol) of o-sulfamoyl phenylacetic acid (VI, R=—H) are introduced in separate portions into polyphosphoric acid (10 ml. of 85% $H_3PO_4$)+15 g. of $P_2O_5$ and then heated at 100° C. for 1 hour. After cooling it is poured into ice and set aside cold, thus obtaining a separation of 1.3 g. of product, M.P. 198–201° C.

EXAMPLE 14

2-ethyl-3,4-dihydro-3-oxo-2H-1,2-benzothiazine S-dioxide (III, R=—$C_2H_5$)

A mixture of 2.43 g. (0.01 mol) of o-ethyl sulfamoyl phenylacetic acid (VI, R=—$C_2H_5$), 4.5 g. of anhydrous sodium acetate and 40 ml. of glacial acetic acid is boiled for 7 hours. It is then cooled, poured into ice and the white solid which has separated out is collected and washed; it is digested in aqueous bicarbonate and then again collected and dried. Yield 1.5 g. of crude product, M.P. 62–63° C.

EXAMPLE 15

2-(P-sulfamoyl phenyl)-3,4-dihydro-3-oxo-2H-1,2-benzothiazine S-dioxide (III, R=—$C_6H_4SO_2NH_2$-p)

A mixture of 7.8 (0.021 mol) of o[N-(p-sulfamoyl phenyl) sulfamoyl] phenylacetic acid (VI, R=—$C_6H_4SO_2NH_2$-p), 9 g. of anhydrous sodium acetate, 80 ml. of glacial acetic acid and 7 ml. of acetic anhydride is boiled under reflux for 6 hours. The solution is then concentrated to about half of its initial volume, cooled and poured into about 300 g. of ice and water. It is set aside overnight in the cold at a temperature from 0° C. to 5° C. The solid which has separated out is collected, washed with water, carefully suspended in a 10% sodium bicarbonate solution, collected, washed, dried (6 g.) and recrystallized.

EXAMPLE 16

2-(P-chlorophenyl)-3,4-dihydro-3-oxo-2H-1,2-benzothiazine S-dioxide (III, R=—$C_6H_4Cl$-p)

4.89 g. (0.015 mol) of o-[N-(p-chlorophenyl)sulfamoyl] phenylacetic acid (VI, R=—$C_6H_4Cl$-p) are intimately mixed with 3.44 g. (0.0165 mol) of $PCl_5$ and heated at 80° C. for 1 hour; a clear solution is initially formed and then a solid mass. It is cooled, treated with ice and water, carefully formed into a suspension, whereupon the suspension is treated with powdered $Na_2CO_3$ until it becomes alkaline; and after having been set aside it is filtered, washed with water and crystallized, thus obtaining 3.8 g. of product.

EXAMPLE 17

2-carboxy methyl-3,4-dihydro-3-oxo-2H-1,2-benzothiazine S-dioxide (III, R=—$CH_2COOH$)

To the solution obtained from 12 ml. of 85% phosphoric acid and 19 g. of $P_2O_5$ there are added in small portions 3.55 g. (0.013 mol) of o-[(N-carboxy methyl) sulfamoyl] phenylacetic acid (VI, R=—$CH_2COOH$), followed by heating at 120° C. for 2 hours. The solution is then cooled, poured into ice and set aside overnight. The white solid which has separated out is collected (2.9 g.; M.P. 200–210° C.) and recrystallized.

EXAMPLE 18

2-allyl-3,4-dihydro-3-oxo-2H-1,2-benzothiazine S-dioxide (III, R=—$CH_2CH=CH_2$)

A mixture of 7.06 g. (0.03 mol) of potash salt [1] of 3,4-dihydro-3-oxo-2H-1,2-benzothiazine S-dioxide (III, R=—K), 3.63 g. (0.03 mol) of allyl bromide and 30 ml. of dimethyl formamide is heated at 65–70° C. for 6 hours and at 100° C. for 0.5 hour; it is cooled, treated with a saturated solution of $Na_2CO_3$, extracted with chloroform, dried and the organic phase evaporated. The oil residue is purified by fractional distillation under vacuum. Yield 5.2 g.

EXAMPLE 19

2-propyl-3,4-dihydro-3-oxo-2H-1,2-benzothiazine S-dioxide (III, R=—$C_3H_7$-n)

A mixture of 9.86 g. (0.05 mol) of 3,4-dihydro-3-oxo-2H-1,2-benzothiazine S-dioxide (III, R=—H), 5.46 g. (0.065 mol) of sodium bicarbonate, 8 g. (0.065 mol) of 1-bromopropane and 120 ml. of dimethyl formamide is heated at 70° C. for 8 hours. Thereupon the dimethyl formamide is expelled under reduced pressure, the residue is treated with a saturated aqueous solution of $NaHCO_3$ and with chloroform and the organic phase is separated, washed with 5% $NaHCO_3$ and with water, dried and evaporated. The oil residue is purified by fractional distillation under vacuum. Yield 5 g. The residue is solidified in the distillation vessel by treatment with isopropyl ether; the solid is collected and crystallized from hexane-benzene and decolorized with charcoal and there is obtained 1.1 g. of 3-propyloxy-4H-1,2-benzothiazine S-dioxide isomer in the form of yellow crystals melting at 95–97° C.

EXAMPLE 20

2 - (3,4 - dihydro - 3 - oxo - 2H - 1,2 - benzothiazin - 2-yl) - N,N - dimethyl acetamide S - dioxide (III, R=—$CH_2CON(CH_3)_2$)

To 3.15 g. (0.016 mol) of 3,4-dihydro-3-oxo-2H-1,2-benzothiazine S-dioxide (III, R=—H) in 25 ml. of anhydrous acetone there are added 2.1 g. (0.017 mol) of N,N-dimethyl-α-chloroacetamide in 10 ml. of anhydrous acetone, 1.43 g. (0.017 mol) of $NaHCO_3$ and a small amount of KI. It is boiled under slight reflux with agitation for 24 hours. The solvent is evaporated, the residue is treated with chloroform and water and the chloroform phase is separated, washed with 5% $NaHCO_3$ and water, dried and evaporated. By crystallization of the residue, 3 g. of product are obtained.

---
[1] The potash salt is obtained by dissolving the 3,4-dihydro-3-oxo-2H-1,2-benzothiazine S-dioxide (III, R=—H) in methyl alcohol, adding the equivalent of methanolic potash, concentrating to a small volume and collecting the solid which is dried at 100° C. under vacuum. M.P. 303–306° C.

EXAMPLE 21

2 - (2 - morpholinoethyl) - 3,4 - dihydro - 3 - oxo - 2H-1,2-benzothiazine S-dioxide

To a suspension of 11.83 g. (0.06 mol) of 3,4-dihydro-3-oxo-2H-1,2-benzothiazine S-dioxide (III, R=—H) in 350 ml. of anhydrous toluene, there are added 8.3 g. (0.06 mol) of anhydrous powdered $K_2CO_3$, 11.17 g. (0.06 mol) of 2-morpholinoethyl chloride hydrochloride and a catalytic amount of copper powder. Boiling is effected under reflux for 12 hours and after cooling filtration is effected and the organic solution is extracted with 2 N hydrochloric acid (twice with 100 ml.). The acid extract is saturated with powdered $Na_2CO_3$ and the base is extracted with ether; the organic phase is washed with a saturated solution of NaCl, dried and evaporated. The oil residue is dissolved in 50 ml. of absolute ethanol, treated with 10% alcoholic HCl in a slight excess; after setting aside in the cold, there are obtained 9 g. of crude hydrochloride which is recrystallized twice.

EXAMPLE 22

2-carbethoxy methyl-3,4-dihydro-3-oxo-2H-1,2-benzothiazine S-dioxide (III, R=$CH_2COOC_2H_5$)

A mixture of 8.0 g. (0.034 mol) of potash salt of 3,4-dihydro - 3 - oxo - 2H - 1,2 - benzothiazine S-dioxide (III, R=—K) and 6 g. (0.036 mol) of ethyl bromoacetate is heated at 150 °C. for 6 hours. After setting aside to cool, the solid mass is treated with a dilute solution of sodium acetate, prepared in a mortar, whereupon the undissolved solid is collected and washed. Yield 7.8 g. M.P. 93–97° C.

EXAMPLE 23

2-(3,4-dihydro-3-oxo-2H-1,2-benzothiazin-2-yl)-N-methyl acetamide S-dioxide (III, R=—$CH_2CONHCH_3$)

3.83 g. (0.015 mol) of 2-carboxy methyl - 3,4 - dihydro - 3 - oxo - 2H - 1,2 - benzothiazine S - dioxide (III, R=—$CH_2COOH$) are suspended in 40 ml. of anhydrous benzene and after addition of 1.3 ml. (0.018 mol) of $SOCl_2$, the mixture is boiled until dissolved (about 4 hours); it is decolorized with charcoal; the solvent is evaporated at reduced pressure; it is dissolved again and evaporated again twice with anhydrous benzene. The acid chloride residue dissolved in 50 ml. of anhydrous benzene is gradually treated while agitating and cooling with 10 ml. of benzene solution containing 0.93 g. (0.03 mol) of monomethyl amine. Agitation is effected for 15 min. at room temperature; the benzene is evaporated at reduced pressure; the residue is treated in water acidulated with HCl; the solid is collected and crystallized. Yield 2 g.

EXAMPLE 24

O-cyanobenzyl sulfonamide (V', R=—H)

A solution of 11.65 g. (0.054 mol) of o-cyanobenzyl sulfochloirde (IV') (P. Ruggli, Helv. Chim. Acta 14, 544; 1931) in 70 ml. of chloroform is added rapidly drop by drop into 200 mol of ammonia of 25° Baumé while agitating and cooling in ice; agitation is continued for a few minutes until the chloroform layer is clear when the agitation is interrupted. The phases are then separated and from the aqueous layer there are obtained by concentration under reduced pressure 7.2 g. of a white crystalline product, M.P. 128–131° C.; the chloroform phase is evaporated to a small volume thereby obtaining an additional 0.85 g. of useful product.

EXAMPLE 25

O-cyano-N-propylbenzyl sulfonamide (V', R=—$C_3H_7$-n)

To the solution of 23.6 g. (0.4 mol) of n-propylamine in 100 ml. of chloroform there are added drop by drop 43.1 g. (0.2 mol) of o-cyanobenzyl sulfochloride (IV')

dissolved in 300 ml. of chloroform while cooling in ice. After having set aside for 10 hours, the solvent is evaporated and the oily residue taken up in water, thus obtaining solidification. The solid is collected and redissolved in 4% NaOH; the alkaline solution is treated with charcoal and filtered, and then reprecipitated with concentrated HCl. The solid obtained, after being collected, washed in water and dried, weighs 38 g., M.P. 85–86° C.

EXAMPLE 26

O-cyano-N-benzyl-benzyl sulfonamide
(V′, R=—CH$_2$C$_6$H$_5$)

To a solution of 6.04 g. (0.028 mol) of o-cyanobenzyl sulfochloride (IV′) in 70 ml. of benzene there is added drop by drop with agitation a solution of 6 g. (0.056 mol) of benzylamine in 15 ml. of benzene. Benzylamine hydrochloride precipitates immediately while the temperature rises gradually to about 55° C.; upon completion of the addition, agitation is continued for 0.5 hour at 60° C., whereupon hot filtration is effected; the filtrate is boiled with charcoal, filtered and allowed to crystallize in the cold, thus obtaining 5.9 g. of product, M.P. 114–116° C.

EXAMPLE 27

O-cyano-N-(p-sulfamoyl phenyl) benzyl sulfonamide
(V′, R=—C$_6$H$_4$SO$_2$NH$_2$-p)

To a solution of 1.72 g. (0.01 mol) of sulfanilamide in 20 ml. of anhydrous acetone there are added 3 ml. of anhydrous pyridine and a solution of 2.16 g. (0.01 mol) of o-cyanobenzyl sulfochloride (IV′) in 20 ml. of acetone. Boiling under reflux is effected for 2.5 hours, followed by decolorization with charcoal, filtration and evaporation at reduced pressure; there remains as residue a light-yellow oil which solidifies upon treatment with dilute HCl; the solid is collected, washed and recrystallized. Yield 1.85 g.

EXAMPLE 28

O-carboxy-N-benzyl-benzyl sulfonamide
(VI′, R=—CH$_2$C$_6$H$_5$)

A solution of 6.3 g. (0.022 mol) of N-benzyl-o-cyanobenzyl sulfonamide (V′, R=—CH$_2$C$_6$H$_5$) is boiled under reflux for 16 hours in 90 ml. of 0.5 N NaOH and then decolorized with charcoal, filtered, cooled and acidified with concentrated HCl, thereby obtaining a pasty precipitate which, upon being set aside, solidifies. The solid is collected and purified by crystallization. Yield 5.4 g.

EXAMPLE 29

O-carboxy-N-phenyl benzyl sulfonamide
(VI′, R=—C$_6$H$_5$)

9.8 g. (0.036 mol) of o-cyano-N-phenyl benzyl sulfonamide (V′, R=—C$_6$H$_5$) are treated with 110 ml. of 1 N NaOH and the solution is boiled under reflux for 18 hours; it is decolorized with charcoal, filtered and acidified while hot; after setting aside, it is filtered, washed and dried. Yield 9.3 g., M.P. 170–172° C.

EXAMPLE 30

O-cyano-N-(m-chlorophenyl)-benzyl sulfonamide
(VI′, R=—C$_6$H$_4$Cl-m)

12.3 g. (0.04 mol) of N-(m-chlorophenyl)-o-cyanobenzyl sulfonamide (V′, R=—C$_6$H$_4$Cl-m) are boiled under reflux for 4 hours in 50 ml. of 30% aqueous NaOH. The mixture is filtered while hot with charcoal and acidified while hot with 1:1 HCl; after being set aside, the solid is collected, washed and dried. Yield 11.6 g., M.P. 175–177° C.

EXAMPLE 31

O-carboxy-N-carboxy methyl benzyl sulfonamide
(VI′, R=—CH$_2$COOH)

3.4 g. (0.012 mol) of 3-carbethoxy methyl-3,4-dihydro-4-oxo-1H-2,3-benzothiazine S-dioxide (III′, R= —CH$_2$COOC$_2$H$_5$) are heated at 120° C. until obtaining a complete solution (about 2 hrs.) in 17 ml. of 5% aqueous NaOH. Thereupon, one filters, cools, acidifies with concentrated HCl and set aside cold until complete crystallization. Yield 2.75 g. of pure product.

EXAMPLE 32

Sodium 2-carboxy benzyl sulfonate (XI′, M=Na)

A mixture of 8.3 g. (0.035 mol) of sodium o-cyanobenzyl sulfonate monohydrate (X′, M=Na) (P. Ruggli, Helv. Chim. Acta 14, 543, 1931) and 40 ml. of a 10% wt./vol. aqueous NaOH solution is boiled under reflux for 16 hours. It is filtered, acidified with concentrated HCl to a pH of about 3. (It may be decolorized and filtered, if desired.) It is then concentrated to about 20 ml. and set aside at 0° C., thus obtaining a separation of white crystals which are collected and dried at 105° C. under vacuum. Yield 6.5 g., M.P. 295–300° C.; M.P. 300° from aqueous ethanol.

*Analysis.*—Calcd. for C$_8$H$_7$NaO$_5$S (percent): C, 40.34; H, 2.96. Found (percent): C, 40.58; H, 3.03.

EXAMPLE 33

O-chlorocarbonyl benzyl sulfochloride (IX′)

2.38 g. (0.010 mol) of sodium o-carbonxy benzyl sulfonate (XI′, M=Na) are mixed intimately with 4.16 g. (0.020 mol) of phosphorus pentachloride; controlling the exothermal nature of the reaction by cooling in ice water; it is then heated for 4 hours in a bath at 80° C.; it is cooled and the reaction mixture treated with ice and set aside for about 0.5 hour in a bath of ice until the POCl$_3$ is completely decomposed. The resultant solid is collected, washed with ice water, dried under vacuum over P$_2$O$_5$, crystallized from anhydrous petroleum ether, and decolored with charcoal. Yield 1.5 g. of white crystals, M.P. 56–58° C.

*Analysis.*—Calcd. for C$_8$H$_6$Cl$_2$O$_3$S (percent): C, 37.96; H, 2.39; Cl, 28.02; S, 12.67. Found (percent): C, 38.09; H, 2.49; Cl, 27.63; S, 12.44.

EXAMPLE 34

O-carbamoyl benzyl sulfonamide (VIII′, R=—H)

To 180 ml. of concentrated ammonia saturated at 0° C. with gaseous ammonia there are added in individual portions with agitation 7.6 g. (0.03 mol) of o-chlorocarbonyl benzyl sulfochloride (IX′); the agitation is then continued for 2 hours while keeping the temperature at 0° C. Concentration is effected under vacuum at room temperature until the greatest part of the ammonia has been eliminated; a solid white product precipitates which is collected, washed and crystallized from water and decolorized with charcoal. Yield 3.3 g. of white crystals, M.P. 208–211° C.

*Analysis.*—Calcd. for C$_8$H$_{10}$N$_2$O$_3$S (percent): C, 44.85; H, 4.70; N, 13.08; S, 14.96. Found (percent): C, 45.15; H, 4.77; N, 13.22; S, 15.25.

By acidifying the liquors from which the crude diamide has been collected, one obtains a precipitate of 3,4-dihydro-4-oxo-1H-2,3-benzothiazine S-dioxide (III), 0.6 g., M.P. 216–220° C.; M.P. 225–227° C. from water/ethanol.

EXAMPLE 35

3,4-dihydro-4-imino-1H-2,3-benzothiazine
S-dioxide (VII′, R=—H)

To 20 ml. of concentrated H$_2$SO$_4$ there are added 0.785 g. (0.003 mol) of o-cyanobenzyl sulfonamide (V′, R=—H); agitation is effected until the sulfonamide is dissolved. The solution is then heated on a boiling water bath for 1 hour, cooled, poured over ice and set aside overnight cold at a temperature of from 0° to 5° C. The white solid which has separated out is collected, washed and crystallized from water. Yield 0.64 g. of white crystals, M.P. 270–272° C. (decomposition).

*Analysis.*—Calcd. for $C_8H_8N_2O_2S$ (percent): N, 14.28; S, 16.34. Found (percent): N, 14.25; S, 16.32.

EXAMPLE 36

3,4-dihydro-4-oxo-1H-2,3-benzothiazine S-dioxide (III', R=—H)

(A) A solution of 5.9 g. (0.03 mol) of o-cyanobenzyl sulfonamide (V', R=—H) in 300 ml. of water containing 2.4 g. (0.06 mol) of NaOH is boiled under reflux for 4 hours; it is treated with charcoal, filtered and acidified to about a pH of 2 with concentrated HCl while cooling in ice; the white solid which has precipitated is collected, washed and dried. Yield 5.4 g., M.P. 221–224° C.

(B) 1.96 g. (0.01 mol) of 3,4-dihydro-4-imino-1H-2,3-benzothiazine S-dioxide (VII', R=—H) are boiled in 20 ml of 1 N NaOH for 4 hours; proceeding as described in (A), 1.6 g. of the product are obtained having a M.P. 225–227° C.

(C) 1.96 g. (0.01 mol) of 3,4-dihydro-4-imino-1H-2,3-benzothiazine S-dioxide (VII', R=—H) are formed into a suspension in 20 ml. of 1 N HCl and the mixture is boiled for 6 hours; upon cooling there is obtained 1.5 g. of the product, M.P. 225–227° C.

(D) 2.14 g. (0.01 mol) of o-carbamoyl-benzyl sulfonamide (VIII', R=—H) are boiled for 4 hours in 20 ml. of 1 N NaOH; proceeding as described in (A), there are obtained 1.7 g. of the product, M.P. 224–227° C. The same product is formed concurrently with o-carbamoyl benzyl sulfonamide (VIII', R=—H) as described above when o-chlorocarbonyl benzyl sulfochloride (IX') is treated with ammonia.

EXAMPLE 37

3-isopropyl-3,4-dihydro-4-oxo-1H-2,3-benzothiazine S-dioxide (III', R=—$C_3H_7$-iso)

10.29 g. (0.04 mol) of o-carboxy-N-isopropyl benzyl sulfonamide (VI', R=—$C_3H_7$-iso) are intimately mixed with 10 g. (0.048 mol) of $PCl_5$ and heated at 60–70° C., for 1 hour (a clear solution is formed). It is cooled and treated with ice and water, thus obtaining the formation of a solid product; the particles are carefully crushed, made alkaline with solid $Na_2CO_3$ and allowed to digest; the white solid is collected and washed and then dried and crystallized. Yield 8.3 g.

EXAMPLE 38

3-benzyl-3,4-dihydro-4-oxo-1H-2,3-benzothiazine S-dioxide (III', R=—$CH_2C_6H_5$)

2.44 g. (0.008 mol) of N-benzyl-o-carboxyl-benzyl sulfonamide (VI', R=—$CH_2C_6H_5$) are treated with 0.9 ml. (0.0125 mol) of $SOCl_2$ and the mixture is heated at 90° C. for 3 hours after which the excess $SOCl_2$ is expelled under vacuum and the solid residue is distributed between aqueous sodium bicarbonate and benzene; the benzene phase is removed, washed, dried, decolorized with charcoal and evaporated; the residue is purified by crystallization. Yield 1.35 g.

EXAMPLE 39

3-(p-sulfamoyl phenyl)-3,4-dihydro-4-oxo-1H-2,3-benzothiazine S-dioxide (III', R=—$C_6H_4SO_2NH_2$-p)

A mixture of 3.7 g. (0.01 mol) of o-carboxy-N-(p-sulfamoyl phenyl) benzyl sulfonamide (VI', R=—$C_6H_4SO_2NH_2$-p)

4.5 g. of anhydrous sodium acetate, 40 ml. of acetic acid and 8 ml. of acetic anhydride are boiled under reflux for 8 hours. The resultant clear solution is concentrated to a small volume and the residue treated with ice and neutralized with sodium bicarbonate; after having been set aside in the cold, the resultant solid is collected, washed and crystallized. Yield 2.5 g. of crystalline white product.

EXAMPLE 40

3-carboxy methyl-3,4-dihydro-4-oxo-1H-2,3-benzothiazine S-dioxide (III', R=—$CH_2COOH$)

A mixture of 0.27 g. (0.001 mol) of o-carboxy-N-carboxy methyl benzyl sulfonamide (VI', R=—$CH_2COOH$) and 0.41 g. (0.002 mol) of $PCl_5$ is heated at 70–80° C. for 3 hrs. thereby producing a light-yellow oily solution which is hydrolyzed with ice and water until the solid product separates (0.21 g., M.P. 187–193° C.). The product is then purified by crystallization.

EXAMPLE 41

2 - (3, 4 - dihydro - 4 - oxo - 1H - 2,3 - benzothiazin - 3-yl) N,N-dimethyl acetamide S-dioxide
(III', R=—$CH_2CON(CH_3)_2$)

A mixture of 12 g. (0.04 mol) of o-carboxy-N-(N,N-dimethyl carbamoyl methyl) benzyl sulfonamide (VI', R=—$CH_2CON(CH_3)_2$), 16 g. of anhydrous sodium acetate, 160 ml. of glacial acetic acid and 16 ml. of acetic anhydride is boiled under reflux for 7 hours. Thereupon, it is evaporated under reduced pressure, the residue taken up in ice water, treated with sodium bicarbonate and then after digestion, the solid product is collected, washed and dried. Yield 5.9 g., M.P. 165–167° C.

EXAMPLE 42

3-propargyl-3,4-dihydro-4-oxo-1H-2,3-benzothiazine S-dioxide (III', R=—$CH_2C{\equiv}CH$)

To 4.7 g. (0.02 mol) of potash salt [2] of 3,4-dihydro-4-oxo-1H-2,3-benzothiazine S-dioxide (III', R=—K) dissolved in 20 ml. of N,N-dimethyl formamide there are added 2.2 g. (0.03 mol) of propargyl chloride, followed by heating at 65–70° C. for 6 hrs. The excess propargyl chloride and the N,N-dimethyl formamide are evaporated under reduced pressure, whereupon the residue is treated with 40 ml. of $Na_2CO$ in 10% aqueous solution; the solid product is collected, washed and crystallized. Yield 3.7 g.

EXAMPLE 43

3-carbethoxy-3,4-dihydro-4-oxo-1H-2,3-benzothiazine S-dioxide (III', R=—$COOC_2H_5$)

To a suspension of 5.91 g. (0.03 mol) of 3,4-dihydro-4-oxo-1H-2,3-benzothiazine S-dioxide (III', R=—H) in 45 ml. of anhydrous benzene and 3 ml. of anhydrous pyridine there is added drop by drop a solution of 3.9 g. (0.036 mol) of ethyl chloroformate in 30 ml. of anhydrous benzene; the temperature rises to 30° C. while pyridine hydrochloride separates out. Agitation is effected for 3 hrs. at room temperature, whereupon filtration is effected, and the residue is washed with benzene on the filter; the combined filtrates are washed with water (twice), with dilute HCl (twice) and again with water; it is dried over $Na_2SO_4$, concentrated until the product

---

[2] The potash salt is obtained by treating, with agitation, a suspension of 82 g. (0.416 mol) of 3,4-dihydro-4-oxo-1H-2,3-benzothiazine S-dioxide (III', R=—H) in 800 ml. of methanol with 208 ml. of 2 N methanolic KOH; there is initially obtained a solution from which the salt separates rapidly. The latter is collected after concentration to a small volue, giving a practically quantitative yield, and it is dried at 100° C. under vacuum. M.P. 249–251° C.

starts to separate out, diluted with ligroin and after having been set aside, 4.7 g. of product are collected, M.P. 118–120° C.

EXAMPLE 44

2 - (3,4 - dihydro - 4 - oxo - 1H - 2,3-benzothiazin-3-yl)-methyl acetamide S-dioxide (III', R=—CH$_2$CON(CH$_3$)$_2$)

A mixture of 9.41 g. (0.04 mol) of potash salt of 3,4-dihydro-4-oxo-2,3-benzothiazine S-dioxide (III', R=—K) and 4.86 g. (0.04 mol) of α-chloro-N,N-dimethyl acetamide is heated for 2 hrs. at 100° C., for 1 hr. at 120° C. and for 1 hr. at 160° C. The reaction mass after cooling is taken up in chloroform and the solution washed with Na$_2$CO$_3$ in dilute solution and with water; the organic phase after being dried and evaporated leaves a residue composed essentially of the desired product accompanied by a small amount of oxygen substitution isomer (lactim form). The purification of this material is effected by heating the fine suspension thereof in 400 ml. of Na$_2$CO$_3$ in 20% aqueous solution at 60–70° C. with agitation for 5 hours; after being set aside at 0° C., the solid is collected, washed and dried. Yield 7.1 g. M.P. 163–165° C.

EXAMPLE 45

3-methyl-3,4-dihydro-4-oxo-1H-2,3-benzothiazine S-dioxide (III', R=—CH$_3$)

To a suspension of 6.9 g. (0.035 mol) of 3,4-dihydro-4-oxo-1H-2,3-benzothiazine S-dioxide (III', R=—H) in 70 ml. of anhydrous ethanol there are added 0.87 g. (0.038 g. at.) of Na dissolved in 30 ml. of anhydrous ethanol and then 5.4 g. (0.038 mol) of methyl iodide; the mixture is boiled and agitated for 8 hrs. and evaporated; the residue is treated with ether and 4% NaOH and the ethereal phase is removed; the latter is washed with water, dried over Na$_2$SO$_4$ and evaporated; the residue is purified by crystallization; yield 4.8 g.

EXAMPLE 46

3-isopropyl-3,4-dihydro-4-oxo-1H-2,3-benzothiazine S-dioxide (III', R=—C$_3$H$_7$-iso)

To a solution of 9.41 g. (0.04 mol) of potash salt of 3,4-dihydro-4-oxo-1H-2,3-benzothiazine S-dioxide (III', R=—K) in 40 ml. of N,N-dimethyl formamide there are added 5.4 g. (0.044 mole) of isopropyl bromide and a catalytic amount of potassium iodide and the mixture is heated at 90–100° C. for 24 hrs. Thereupon evaporation is effected at reduced pressure, the residue is treated with chloroform and 4% NaOH and the organic phase is removed; it is washed with water, dried over Na$_2$SO$_4$ and evaporated; the residue is crystallized from a hexane-benzene mixture, which gives 3 g. of the 4-isopropyloxy-1H-2,3-benzothiazine S-dioxide isomer, M.P. 182–183° C. The crystallization mother liquors are evaporated and the residue boiled for 10 hrs. in a mixture of 7 ml. of dioxan and 3 ml. of 5 N HCl; after evaporation of the solvent, the residue is made alkaline with 0.5 N NaOH and extracted with ether, the ethereal phase is washed with water, dried over Na$_2$SO$_4$ and evaporated; and the residue is crystallized, which gives 0.27 g. of the desired product.

EXAMPLE 47

3-carboxy methyl-3,4-dihydro-4-oxo-1H-2,3-benzothiazine S-dioxide (III', R=—CH$_2$COOH)

0.56 g. (0.002 mol) of 3-carbethoxy methyl-3,4-dihydro-4-oxo-1H-2,3-benzothiazine S-dioxide (III', R=—CH$_2$COOC$_2$H$_5$)

is suspended in 3 ml. of water and 1 ml. of concentrated HCl and the suspension boiled until a complete solution is formed (about 3 hrs.); the solution is then treated with charcoal, filtered while boiling and set aside to crystallize, thus obtaining 0.45 g. of product, M.P. 190–192° C.

EXAMPLE 48

3-chlorocarbonyl methyl-3,4-dihydro-4-oxo-1H,2,3-benzothiazine S-dioxide (III', R=—CH$_2$COCl)

A mixture of 5.1 g. (0.02 mol) of 3-carboxy methyl-3,4-dihydro-4-oxo-1H-2,3-benzothiazine S-dioxide (III', R=—CH$_2$COOH), 40 ml. of anhydrous benzene and 2 ml. of thionyl chloride is boiled under reflux until completely dissolved (about 8 hrs.). Evaporation is effected at reduced pressure to expel the benzene and the excess thionyl chloride; the residue is taken up in a minimum of anhydrous benzene and precipitated with excess dry petroleum ether. Yield 4.9 g., M.P. 108–113° C.

EXAMPLE 49

2-(3,4-dihydro-4-oxo - 1H - 2,3 - benzothiazin-3-yl)-N-methyl acetamide S-dioxide (III', R=—CH$_2$CONHCH$_3$)

22 ml. of benzene solution containing 2.17 g. (0.07 mol) of methylamine are introduced drop by drop with agitation and cooling into a solution of 9.58 g. (0.035 mol) of 3-chlorocarbonyl methyl-3,4-dihydro-4-oxo-1H-2,3-benzothiazine S-dioxide (III', R=—CH$_2$COOCl) in 100 ml. of benzene. There is obtained a suspension which is agitated for a further 15 min., whereupon the benzene is evaporated, the residue is treated with water and the solid is collected; the latter is formed into a suspension in a dilute solution of sodium bicarbonate and after digestion it is collected again, washed and crystallized. Yield 7 g.

EXAMPLE 50

Hhydrochloride of 2-(3,4 - dihydro-4-oxo-1H-2,3-benzothiazin-3-yl)-N-[3-(dimethylamino) propyl] acetamide S-dioxide (III', R=—CH$_2$CONHCH$_2$CH$_2$N(CH$_3$)$_2$.HCl)

To a solution of 6.84 g. (0.025 mol) of 3-chlorocarbonyl methyl - 3,4 - dihydro-4-oxo-1H-2,3-benzothiazine S-dioxide (III', R=—CH$_2$COCl) in 30 ml. of anhydrous acetone there is added gradually, with agitation, a solution of 2.55 g. (0.025 mol) of 3-dimethylaminopropylamine in 12 ml. of anhydrous acetone and the mixture is boiled under reflux for 2 hrs. The resultant suspension is cooled, whereupon the product is collected, washed with dry acetone and recrystallized. Yield 5.5 g.

EXAMPLE 51

Hydrochloride of 2-(3,4 - dihydro-4-oxo-1H-2,3-benzothiazin-3-yl) acetate of 2-dimethylaminoethyl S-dioxide (III', R=—CH$_2$COOCH$_2$CH$_2$N(CH$_3$)$_2$.HCl)

To a solution of 2.22 g. (0.025 mol) of 2-dimethylaminoethanol in 20 ml. of anhydrous acetone there is added gradually, with agitation, a solution of 6.84 g. (0.025 mol) of 3-chlorocarbonyl methyl-3,4-dihydro-4-oxo-1H-2,3-benzothiazine S-dioxide (III', R=—CH$_2$COCl)

in 35 ml. of anhydrous acetone; there is first removed an oil which solidifies after boiling for 2 hrs. under reflux; the precipitate is cooled, filtered, washed with anhydrous acetone and dried. Yield 7.1 g., M.P. 202–207° C.

The identifying characteristics of the final products of Formulas III and III' and of the intermediate products of Formulas V, V', VI and VI' prepared by the methods illustrated in the above examples are set forth in the following tables.

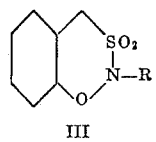

III

| R | M.P. (° C.)/ B.P. (° C. mm.) | Crystallization solvent | Overall formula | Calculated | | | | Found | | | |
|---|---|---|---|---|---|---|---|---|---|---|---|
| | | | | C | H | N | S | C | H | N | S |
| H | 202–204 | E-W | C₈H₇NO₃S | 48.72 | 3.58 | 7.10 | | 48.03 | 3.42 | 6.99 | |
| CH₃ | 89–91 | L | C₉H₉NO₃S | 51.17 | 4.29 | | 15.18 | 51.47 | 4.41 | | 14.91 |
| C₂H₅ | 64–66 | PE | C₁₀H₁₁NO₃S | 53.32 | 4.92 | | | 53.28 | 5.17 | | |
| C₃H₇-n | 150–153/0.8 | | C₁₁H₁₃NO₃S | 55.21 | 5.47 | | | 55.14 | 5.62 | | |
| C₃H₇-iso | 90–91 | H | C₁₁H₁₃NO₃S | 55.21 | 5.47 | 5.85 | 13.40 | 54.88 | 5.14 | 5.93 | 13.67 |
| C₄H₉-n | {158–159/0.9, 43–44} | H-B | C₁₂H₁₅NO₃S | 56.89 | 5.97 | | | 56.96 | 6.00 | | |
| CH₂CH=CH₂ | 157–160/0.9 | | C₁₁H₁₁NO₃S | 55.68 | 4.67 | | | 55.71 | 4.93 | | |
| CH₂C≡CH | 165–167 | EW | C₁₁H₉NO₃S | 56.16 | 3.86 | 5.95 | | 55.89 | 3.83 | 5.93 | |
| CH₂C₆H₅ | 150–153 | P | C₁₅H₁₃NO₃S | 62.70 | 4.56 | | | 62.85 | 4.70 | | |
| C₆H₅ | 122–123 | EW | C₁₄H₁₁NO₃S | 61.52 | 4.06 | 5.12 | | 61.22 | 4.19 | 5.28 | |
| C₆H₄Cl-o | 125–127 | P | C₁₄H₁₀ClNO₃S | 54.63 | 3.27 | 4.55 | | 54.34 | 3.39 | 4.18 | |
| C₆H₄Cl-m | 208–211 | EW | C₁₄H₁₀ClNO₃S | 54.63 | 3.27 | 4.55 | | 54.70 | 3.38 | 4.64 | |
| C₆H₄Cl-p | 151–153 | EW | C₁₄H₁₀ClNO₃S | 54.63 | 3.27 | 4.55 | | 54.84 | 3.27 | 4.44 | |
| C₆H₄'SO₂NH₂-p | 202–205 | E | C₁₄H₁₂N₂O₅S₂ | 47.72 | 3.43 | 7.95 | | 48.04 | 3.78 | 8.15 | |
| CH₂CH₂N⌬O·HCl | 235–238 | E | C₁₅H₁₈ClN₂O₄S | | | 8.08 | *10.22 | | | 8.23 | *10.52 |
| CH₂COOH | 211–213 | W | C₁₀H₉NO₅S | 47.05 | 3.55 | | | 47.12 | | 3.24 | |
| CH₂COOC₂H₅ | 96–99 | L | C₁₂H₁₃NO₅S | 50.87 | 4.62 | | | 50.87 | 4.83 | | |
| CH₂CONH₂ | 157–159 | P | C₁₀H₁₀N₂O₄S | 47.23 | 3.96 | 11.02 | 12.61 | 47.53 | 3.93 | 10.80 | 12.83 |
| CH₂CONHCH₃ | 187–190 | E-W | C₁₁H₁₂N₂O₄S | 49.25 | 4.51 | 10.44 | 11.95 | 48.91 | 4.54 | 10.25 | 12.07 |
| CH₂CON(CH₃)₂ | 162–164 | E-W | C₁₂H₁₄N₂O₄S | 51.05 | 5.00 | 9.92 | | 51.22 | 5.14 | 10.12 | |

NOTE.—E=ethanol; W=water; L=ligroin; PE=petroleum ether; H=hexane; Ew=ethanol 95°; P=2-propanol; *=Cl.

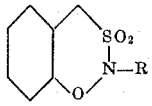

III'

| R | M.P. (° C.)/ B.P. (° C. mm.) | Crystallization solvent | Overall formula | Calculated | | | | Found | | | |
|---|---|---|---|---|---|---|---|---|---|---|---|
| | | | | C | H | N | S | C | H | N | S |
| H | 225–227 | E-W | C₈H₇NO₃S | | | 7.10 | 16.26 | | | 7.16 | 16.08 |
| CH₃ | 139–141 | B-H | C₉H₉NO₃S | 51.17 | 4.29 | 6.63 | 15.18 | 50.99 | 4.05 | 6.46 | 15.17 |
| C₂H₅ | 161–163.5 | B-L | C₁₀H₁₁NO₃S | 53.32 | 4.92 | | | 52.95 | 4.75 | | |
| C₃H₇-n | 130–132 | B-H | C₁₁H₁₃NO₃S | 55.21 | 5.47 | 5.85 | 13.40 | 55.64 | 5.61 | 5.75 | 13.07 |
| C₃H₇-iso | 91–92 | B-H | C₁₁H₁₃NO₃S | 55.21 | 5.47 | 5.85 | 13.40 | 55.23 | 5.51 | 5.94 | 13.65 |
| C₄H₉-n | {138–140/0.3, 80–82} | B-H | C₁₂H₁₅NO₃S | 56.89 | 5.97 | 5.53 | 12.66 | 56.96 | 5.87 | 5.48 | 12.62 |
| CH₂CH=CH₂ | 99–102 | P | C₁₁H₁₁NO₃S | 55.68 | 4.67 | | | 55.47 | 4.98 | | |
| CH₂C≡CH | 180–182 | Ew | C₁₁H₉NO₃S | 56.16 | 3.86 | | | 56.07 | 4.03 | | |
| CH₂C₆H₅ | 140–143 | L-B | C₁₅H₁₃NO₃S | 62.70 | 4.56 | | | 62.67 | 4.50 | | |
| C₆H₅ | 164–166 | Ew | C₁₄H₁₁NO₃S | 61.52 | 4.06 | 5.12 | | 62.71 | 4.15 | 4.98 | |
| C₆H₄Cl-o | 192–194 | Ew | C₁₄H₁₀ClNO₃S | 54.63 | 3.27 | 4.55 | | 54.54 | 3.56 | 4.78 | |
| C₆H₄Cl-m | 141–143 | Ew | C₁₄H₁₀ClNO₃S | | | 4.55 | 10.42 | | | 4.50 | 10.50 |
| C₆H₄Cl-p | 178–179 | Ew | C₁₄H₁₀ClNO₃S | 54.63 | 3.27 | 4.55 | | 54.53 | 3.09 | 4.65 | |
| C₆H₄·SO₂NH₂-p | 231–233 | E-W | C₁₄H₁₂N₂O₅S₂ | 47.72 | 3.43 | | | 47.73 | 3.48 | | |
| CH₂CH₂N(C₂H₅)₂·HCl base | {219–223, 185–195/1} | E | C₁₅H₂₀ClN₂O₄S | | | 8.42 | ¹10.45 | | | 8.81 | ¹10.80 |
| CH₂CH₂N(C₃H₇-iso)₂·HCl·C₂H₅OH | 180–184 | E-EA | C₁₈H₃₁ClN₂O₄S | | | ²11.07 | 6.88 | ¹8.71 | | ²11.01 | 6.94 | ¹8.68 |
| CH₂CH₂N⌬·HCl·C₂H₅OH | 131.5–133 | E-EA | C₁₇H₂₇ClN₂O₄S | | | ²11.53 | 7.16 | ¹9.07 | | ²11.58 | 7.24 | ¹9.01 |
| CH₂CH₂N⌬O·HCl | 200–204 | E | C₁₄H₁₉ClN₂O₄S | | | 8.08 | ¹10.22 | | | 8.04 | ¹10.21 |
| COOC₂H₅ | 119–121 | B-L | C₁₁H₁₁NO₅S | 49.07 | 4.12 | | | 49.38 | 3.84 | | |
| CH₂COOH | 192–194 | W | C₁₀H₉NO₅S | 47.05 | 3.55 | | | 47.21 | 3.46 | | 100.2 |
| CH₂COCl | 110–113 | L | C₁₀H₈ClNO₄S | | | | ¹12.96 | | | | ¹13.27 |
| CH₂COOC₂H₅ | 98–101 | L | C₁₂H₁₃NO₅S | 50.87 | 4.62 | | | 51.01 | 4.66 | | |
| CH₂COOCH₂CH₂N(CH₃)₂·HCl | 206–208 | E | C₁₄H₁₉ClN₂O₅S | | | 7.72 | | | | 7.81 | 99.2 |
| CH₂COOCH₂CH₂N(C₂H₅)₂·HCl | 181–183 | P | C₁₆H₂₃ClN₂O₅S | 49.16 | 5.93 | 7.17 | | 49.36 | 6.07 | 7.39 | |
| CH₂COOCH₂CH₂N⌬·HCl | 157–160 | E-EE | C₁₇H₂₃ClN₂O₅S | 50.68 | 5.75 | | | 50.84 | 5.97 | | |
| CH₂COOCH₂CH₂N⌬O·HCl | 184–187 | E | C₁₆H₂₁ClN₂O₆S | 47.46 | 5.23 | 6.92 | | 47.47 | 5.17 | 6.98 | |
| CH₂CONH₂ | 189–191 | W | C₁₀H₁₀N₂O₄S | | | 11.02 | | | | 10.97 | |
| CH₂CONHCH₃ | 156–158 | E-W | C₁₁H₁₂N₂O₄S | 49.25 | 4.51 | 10.44 | 11.95 | 49.50 | 4.37 | 10.41 | 11.73 |
| CH₂CONH(C₃H₇-iso) | 171–173 | Ew | C₁₃H₁₆N₂O₄S | 52.69 | 5.44 | 9.45 | 10.82 | 52.89 | 5.09 | 9.26 | 10.53 |
| CH₂CON(CH₃)₂ | 165–167 | EA | C₁₂H₁₄N₂O₄S | 51.05 | 5.00 | 9.92 | | 50.91 | 5.30 | 9.59 | |
| CH₂CON(C₂H₅)₂ | 134–136 | B-H | C₁₄H₁₈N₂O₄S | 54.18 | 5.84 | 9.03 | 10.33 | 54.23 | 6.09 | 8.86 | 10.11 |
| CH₂CON(C₃H₇-n)₂ | 98–100 | B-H | C₁₆H₂₂N₂O₄S | 56.78 | 6.55 | 8.28 | 9.47 | 56.60 | 6.49 | 8.25 | 9.39 |
| CH₂CON(C₃H₇-iso)₂ | 187–189 | Ew | C₁₆H₂₂N₂O₄S | 56.78 | 6.55 | 8.28 | 9.47 | 56.84 | 6.58 | 8.23 | 9.86 |
| CH₂CON⌬ | 182–184 | Ew | C₁₄H₁₆N₂O₄S | 54.53 | 5.23 | 9.08 | 10.40 | 54.54 | 5.12 | 9.08 | 10.42 |

TABLE—Continued

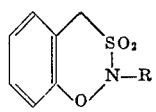
III'

| R | M.P. (° C.)/ B.P. (° C. mm.) | Crystal-lization solvent | Overall formula | Calculated | | | | Found | | | |
|---|---|---|---|---|---|---|---|---|---|---|---|
| | | | | C | H | N | S | C | H | N | S |
| CH₂CON⟨⟩ | 180–181 | Ew | C₁₅H₁₈N₂O₄S | 55.88 | 5.63 | 8.69 | 9.95 | 55.80 | 5.45 | 8.72 | 9.77 |
| CH₂CN⟨⟩O | 217.5–219.5 | Ew | C₁₄H₁₆N₂O₅S | 51.84 | 4.97 | 8.64 | 9.88 | 51.93 | 5.17 | 8.61 | 9.90 |
| CH₂CON⟨⟩N–CH₃ | 172–174 | P | C₁₅H₁₉N₃O₄S | 53.40 | 5.68 | 12.45 | 9.50 | 53.16 | 5.68 | 12.15 | 9.44 |
| CH₂CONHCH₂CH₂N⟨⟩O·HCl | 246–249 | Ew | C₁₆H₂₂ClN₃O₅S | 47.58 | 5.49 | 10.40 | | 47.61 | 5.61 | 10.27 | |
| CH₂CONHCH₂CH₂N(CH₃)₂·HCl | 223–224 | E | C₁₅H₂₂ClN₃O₄S | 47.93 | 5.90 | 11.18 | | 48.20 | 6.09 | 11.18 | |

NOTE.—¹=Cl; ²=C₂H₅O; E=ethanol; W=water; B=benzene; H=hexane; L=ligroin; P=2-propanol; Ew=ethanol 95°; EA=ethyl acetate; EE=ethyl ether; °=alkalimetric value; %=acidimetric value.

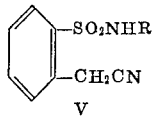
V

| R | M.P. (° C.) | Crystal-lization solvent | Overall formula | Calculated | | | | Found | | | |
|---|---|---|---|---|---|---|---|---|---|---|---|
| | | | | C | H | N | S | C | H | N | S |
| H | 161–163 | E-W | C₈H₈N₂O₂S | 48.96 | 4.11 | 14.23 | 16.34 | 48.73 | 4.31 | 14.31 | 16.54 |
| C₂H₅ | 65–66 | B-PE | C₁₀H₁₂N₂O₂S | 53.56 | 5.39 | 12.49 | | 53.71 | 5.40 | 12.76 | |
| C₃H₇-iso | 155–158/0.1 | | C₁₁H₁₄N₂O₂S | 55.44 | 5.92 | 11.76 | 13.45 | 55.36 | 6.14 | 11.70 | 13.14 |
| CH₂C₆H₅ | 84–86 | B-L | C₁₅H₁₄N₂O₂S | 62.92 | 4.93 | | | 63.20 | 4.99 | | |
| C₆H₅ | 62–65 | B-L | C₁₄H₁₂N₂O₂S | 61.75 | 4.44 | 10.29 | 11.77 | 61.52 | 4.52 | 10.35 | 11.94 |
| C₆H₄Cl-o | 96–98 | B-L | C₁₄H₁₁ClN₂O₂S | 54.81 | 3.61 | 9.13 | | 54.76 | 3.90 | 9.38 | |
| C₆H₄Cl-m | 136–138 | B-L | C₁₄H₁₁ClN₂O₂S | | | 9.13 | | | | 9.11 | |
| C₆H₄Cl-p | 125–127 | B-L | C₁₄H₁₁ClN₂O₂S | 54.81 | 3.61 | 9.13 | | 54.77 | 3.57 | 8.92 | |
| C₆H₄.SO₂NH₂-p | 166–168 | W | C₁₄H₁₃N₃O₄S₂ | | | 11.96 | 18.25 | | | 12.04 | 18.23 |

NOTE.—E=ethanol; W=water; B=benzene; PE=petroleum ether; L=ligroin.

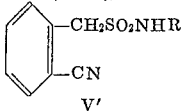
V'

| R | M.P. (° C.) | Crystal-lization solvent | Overall formula | Calculated | | | | Found | | | |
|---|---|---|---|---|---|---|---|---|---|---|---|
| | | | | C | H | N | S | C | H | N | S |
| H | 128–130 | B | C₈H₈N₂O₂S | 48.96 | 4.11 | 14.28 | | 48.92 | 4.00 | 14.37 | |
| C₂H₅ | 107–108 | B-L | C₁₀H₁₂N₂O₂S | 53.56 | 5.39 | 12.49 | | 53.59 | 5.34 | 15.52 | |
| C₃H₇-n | 87–88 | B-H | C₁₁H₁₄N₂O₂S | 55.44 | 5.92 | 11.76 | | 55.43 | 5.62 | 11.79 | 13.40 |
| C₃H₇-iso | 93–95 | B-H | C₁₁H₁₄N₂O₂S | 55.44 | 5.92 | 11.76 | 13.45 | 55.13 | 5.83 | 11.73 | 12.94 |
| CH₂C₆H₅ | 116–118 | B | C₁₅H₁₄N₂O₂S | 62.92 | 4.93 | | | 63.26 | 5.20 | | |
| C₆H₅ | 140–141 | B-L | C₁₄H₁₂N₂O₂S | 61.75 | 4.44 | 10.29 | 11.77 | 62.16 | 4.41 | 10.46 | 11.82 |
| C₆H₄Cl-o | 125–127 | B-L | C₁₄H₁₁ClN₂O₂S | 54.81 | 3.61 | 9.13 | | 54.89 | 3.61 | 9.11 | |
| C₆H₄Cl-m | 147–149 | W-A | C₁₄H₁₁ClN₂O₂S | 54.81 | 3.61 | 9.13 | | 54.86 | 3.57 | 9.34 | |
| C₆H₄Cl-p | 173–175 | B | C₁₄H₁₁ClN₂O₂S | 54.81 | 3.61 | 9.13 | | 54.51 | 3.64 | 9.14 | |
| C₆H₄.SO₂NH₂-p | 210–212 | E-W | C₁₄H₁₃N₃O₄S₂ | 47.85 | 3.73 | 11.96 | | 47.87 | 4.06 | 11.90 | |
| CH₂CH₂N(C₂H₅)₂ | 56–57.5 | IE | C₁₄H₂₁N₃O₃S | 56.92 | 7.16 | 14.22 | | 56.75 | 7.10 | 14.18 | |

NOTE.—B=benzene; L=ligroin; H=hexane; W=water; A=acetone; E=ethanol; IE=isopropyl ether.

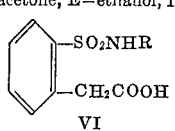
VI

| R | M.P. (° C.) | Crystal-lization solvent | Overall formula | Calculated | | | | Found | | | |
|---|---|---|---|---|---|---|---|---|---|---|---|
| | | | | C | H | N | S | C | H | N | S |
| H | 185–187 | W | C₈H₉NO₄S | 44.64 | 4.21 | 6.51 | | 44.63 | 4.41 | 6.50 | |
| C₂H₅ | 144–146 | W | C₁₀H₁₃NO₄S | 49.37 | 5.38 | 5.76 | | 49.24 | 5.11 | 6.06 | |
| C₃H₇-iso | 115.5–117 | W | C₁₁H₁₅NO₄S | 51.34 | 5.88 | 5.44 | 12.46 | 51.30 | 6.06 | 5.40 | 12.53 |
| CH₂C₆H₅ | 121–123 | W | C₁₅H₁₅NO₄S | 59.00 | 4.95 | 4.59 | | 58.80 | 4.85 | 4.59 | |
| CH₂COOH | 192–194 | W | C₁₀H₁₁NO₆S | 43.95 | 4.06 | | | 44.08 | 4.38 | | ¹99.6 |
| C₆H₅ | 162–164 | E-W | C₁₄H₁₃NO₄S | | | 4.81 | 11.01 | | 5.01 | 11.04 | |
| C₆H₄Cl-o | 146–148 | E-W | C₁₄H₁₂ClNO₄S | 51.62 | 3.71 | 4.30 | | 51.45 | 4.01 | 4.60 | |
| C₆H₄Cl-m | 159–163 | W | C₁₄H₁₂ClNO₄S | | | 4.30 | | | | 4.53 | |
| C₆H₄Cl-p | 128–130 | E-W | C₁₄H₁₂ClNO₄S | | | 4.30 | 9.84 | | | 4.60 | 10.09 |
| C₆H₄.SO₂NH₂-p | 202–204 | W | C₁₄H₁₄N₂O₆S₂ | 45.40 | 3.81 | | | 45.18 | 4.10 | | |

NOTE.—¹=alkalimetric value; W=water; E=ethanol.

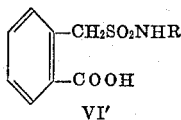

VI'

| R | M.P. (° C.) | Crystallization solvent | Overall formula | Calculated | | | | Found | | | |
|---|---|---|---|---|---|---|---|---|---|---|---|
| | | | | C | H | N | S | C | H | N | S |
| $C_2H_5$ | 142–144 | W | $C_{10}H_{13}NO_4S$ | 49.37 | 5.8 | 5.76 | 13.18 | 49.17 | 5.55 | 5.58 | 13.36 |
| $C_3H_7$-n | 155–157 | W | $C_{11}H_{15}NO_4S$ | 51.34 | 5.88 | 5.44 | 12.46 | 50.96 | 5.93 | 5.53 | 11.96 |
| $C_3H_7$-iso | 168–170 | W | $C_{11}H_{15}NO_4S$ | 51.34 | 5.88 | 5.44 | 12.46 | 51.54 | 5.87 | 5.21 | 12.01 |
| $CH_2C_6H_5$ | 181–184 | W | $C_{15}H_{15}NO_4S$ | 59.00 | 4.95 | | | 59.14 | 5.12 | | |
| $CH_2COOH$ | 179–180 | W | $C_{10}H_{11}NO_6S$ | 43.95 | 4.06 | | | 44.10 | 4.05 | | [2]98.3 |
| $CH_2CON(CH_3)_2$ | 185–187 | W | $C_{12}H_{16}N_2O_5S$ | 48.04 | 5.37 | 9.34 | 10.69 | 48.30 | 5.72 | 9.45 | 10.88 |
| $C_6H_5$ | 171–173 | E-W | $C_{14}H_{13}NO_4S$ | 57.72 | 4.50 | 4.81 | 11.01 | 57.79 | 4.57 | 4.83 | 11.14 |
| $C_6H_4Cl$-o | 161–162.5 | E-W | $C_{14}H_{12}ClNO_4S$ | 51.62 | 3.71 | 4.30 | | 51.52 | 3.80 | 4.23 | |
| $C_6H_4Cl$-m | 177–179 | E-W | $C_{14}H_{12}ClNO_4S$ | 51.62 | 3.71 | 4.30 | [1]10.88 | 52.00 | 3.80 | 4.29 | [1]11.25 |
| $C_6H_4Cl$-p | 177–179 | Ew | $C_{14}H_{12}ClNO_4S$ | 51.62 | 3.71 | 4.30 | | 51.59 | 3.73 | 4.32 | |
| $C_6H_4.SO_2NH_2$-p | 219–221 | E-W | $C_{14}H_{14}N_2O_6S_2$ | 45.40 | 3.81 | 7.56 | | 45.18 | 3.86 | 7.20 | |

Note.—[1]=Cl; [2]=alkalimetric value; W=water; E=ethanol; Ew=ethanol 5°.

What we claim is:
1. A compound of the formula:

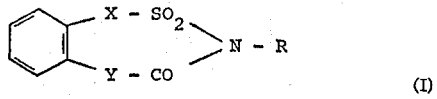

in which either X or Y is a single bond and the other is a methylene group ($CH_2$) and R represents hydrogen or lower alkyl, lower alkenyl, propargyl, benzyl, carbethoxy, di-lower-alkylamino-lower-alkyl or cycloalkylene containing 4 or 5 carbon atoms imino lower alkyl or morpholino lower alkyl or a group of formula —$CH_2$—$COOR_1$ in which $R_1$ represents hydrogen or lower alkyl, di-lower-alkylamino-lower-alkyl or cycloalkylene containing 4 or 5 carbon atoms imino alkyl or morpholino lower alkyl or R represents a group of formula:

in which $R_2$ and $R_3$ are identical or different and each represent hydrogen or lower alkyl or lower alkenyl or di-lower-alkylamino-lower alkyl or cycloalkylene containing 4 or 5 carbon atoms imino lower alkyl or morpholino lower alkyl group or form, together with the nitrogen atom to which they are attached, a cycloalkylene containing 4 or 5 carbon atoms imino, morpholino or N-methyl piperazino, or R represents unsubstituted phenyl or chloro-substituted or sulfamoyl-substituted phenyl or R represents pharmaceutically acceptable acid addition salts of the compounds of Formula I which have a basic nitrogen atom.

2. A compound according to claim 1 wherein said alkyl and alkenyl group which are represented by R or which form part thereof have 1 to 5 carbon atoms.

3. A compound according to claim 1 wherein R represents lower alkyl or lower alkenyl or a group of the formula:

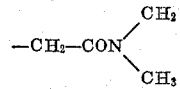

in which $R_2$ and $R_3$ are as defined above.

4. 2 - (3,4 - dihydro - 4-oxo-1H-2,3-benzothiazin-3-yl)-N,N-dimethylacetamide S-dioxide of the formula:

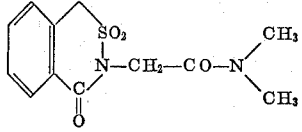

References Cited

UNITED STATES PATENTS 3,152,138  10/1964  Aichenegg et al. ___ 260—243 X
3,314,949  4/1967  Wei et al. _____ 260—243
3,467,656  9/1969  Metlesics et al. ____ 260—243 X
3,546,220  12/1970  Stein et al. _____ 260—243

JOHN M. FORD, Primary Examiner

U.S. Cl. X.R.

424—246